United States Patent
Goldsberry et al.

(10) Patent No.: US 11,830,995 B1
(45) Date of Patent: Nov. 28, 2023

(54) APPARATUS FOR ACTIVE BATTERY PACK COOLING

(71) Applicant: BETA AIR, LLC, South Burlington, VT (US)

(72) Inventors: Nathan Goldsberry, South Burlington, VT (US); Stuart Denson Schreiber, Essex, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/752,117

(22) Filed: May 24, 2022

(51) Int. Cl.
| | |
|---|---|
| H01M 10/613 | (2014.01) |
| H01M 50/204 | (2021.01) |
| H01M 10/6568 | (2014.01) |
| H01M 10/6556 | (2014.01) |
| H01M 10/6555 | (2014.01) |
| H01M 10/63 | (2014.01) |
| H01M 10/48 | (2006.01) |
| H01M 10/6552 | (2014.01) |

(Continued)

(52) U.S. Cl.
CPC ....... *H01M 10/613* (2015.04); *H01M 10/425* (2013.01); *H01M 10/482* (2013.01); *H01M 10/486* (2013.01); *H01M 10/63* (2015.04); *H01M 10/6552* (2015.04); *H01M 10/6555* (2015.04); *H01M 10/6556* (2015.04); *H01M 10/6568* (2015.04); *H01M 50/204* (2021.01); *B64D 33/08* (2013.01); *H01M 2010/4271* (2013.01); *H01M 2220/20* (2013.01)

(58) Field of Classification Search
CPC ............... H01M 10/613; H01M 10/63; H01M 10/6552; H01M 10/6555; H01M 10/6556; H01M 10/6568; H01M 10/425; H01M 10/482; H01M 10/486
See application file for complete search history.

(56) References Cited

U.S. PATENT DOCUMENTS

| | | |
|---|---|---|
| 8,852,772 B2 | 10/2014 | Mcdonald |
| 8,877,366 B2 | 11/2014 | Weber et al. |
| 9,196,935 B2 | 11/2015 | Han et al. |

(Continued)

FOREIGN PATENT DOCUMENTS

| | | |
|---|---|---|
| CN | 210640315 U | 5/2020 |
| CN | 111786052 A | 10/2020 |

(Continued)

OTHER PUBLICATIONS

Dana, Long Thermal Products, Hybrid & Electric Vehicle Battery Cooling Technologies, Dec. 20, 2021.

*Primary Examiner* — Jimmy Vo
(74) *Attorney, Agent, or Firm* — CALDWELL INTELLECTUAL PROPERTY LAW

(57) ABSTRACT

An apparatus for active battery pack cooling including a battery pack with a plurality of battery modules. The apparatus further including an active cooling system with a coolant channel, wherein the coolant channel includes a coolant fluid. The active cooling system is in thermal communication with more than one of the plurality of battery modules. The apparatus also including a plurality of passive heat transfer elements, wherein each of the plurality of passive heat transfer elements is connected to the active cooling system, extends to a battery module of the plurality of battery modules, and extends away from the coolant channel.

18 Claims, 8 Drawing Sheets

(51) Int. Cl.
*H01M 10/42* (2006.01)
*B64D 33/08* (2006.01)

(56) References Cited

U.S. PATENT DOCUMENTS

| | | |
|---|---|---|
| 9,774,015 B2 | 9/2017 | Moon et al. |
| 10,033,072 B2 | 7/2018 | Bhola et al. |
| 10,770,744 B2 | 9/2020 | Kruger et al. |
| 10,892,528 B2 | 1/2021 | Yoo et al. |
| 2011/0206964 A1 | 8/2011 | Odumodu et al. |
| 2018/0358664 A1 | 12/2018 | Zhang et al. |

FOREIGN PATENT DOCUMENTS

| | | | | |
|---|---|---|---|---|
| CN | 114069092 A | * | 2/2022 | |
| DE | 102008062158 A1 | * | 6/2010 | .......... H01M 10/482 |
| DE | 102013113799 A1 | * | 6/2015 | ........ H01M 10/0481 |
| WO | WO-2011146919 A2 | * | 11/2011 | .......... H01M 10/613 |

\* cited by examiner

APPARATUS FOR ACTIVE BATTERY PACK COOLING

FIELD OF THE INVENTION

The present invention generally relates to the field of cooling systems. In particular, the present invention is directed to an apparatus for active battery pack cooling.

BACKGROUND

Electric aircraft represent a compelling opportunity to move the aerospace industry away from polluting, fossil fuel sources of energy. However, batteries require increased cooling in order to maintain ideal working conditions and avoid thermal runaway. Active cooling systems, which often contain a fluid coolant, can be effective, but can increase complexity, cost, and weight due to the fluid connections. Existing solutions are not adequate.

SUMMARY OF THE DISCLOSURE

In an aspect, an apparatus for active battery pack cooling, the apparatus including a battery pack including a plurality of battery modules. The apparatus further including an active cooling system, the active cooling system including a coolant channel wherein the coolant channel includes a coolant fluid, wherein the active cooling system is in thermal communication with more than one of the plurality of battery modules The apparatus also including a plurality of passive heat transfer elements, wherein each of the plurality of passive heat transfer elements is connected to the active cooling system, extends to a battery module of the plurality of battery modules, and extends away from the coolant channel.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed apparatuses for active battery pack cooling. These apparatuses may incorporate passive heat transfer elements in order to limit the amount of active cooling needed. The active cooling system may include a coolant channel. The coolant channel includes coolant fluid, wherein the coolant fluid may flow from an active cooling input to an active cooling output and by doing so, provide cooling. In aspects the apparatus may include a pump to move the coolant fluid from the active cooling input to the active cooling output. In some aspects, this pump may be controlled by a controller in response to temperature measurements from a temperatures sensor. The temperature sensor may measure the temperature of the battery pack, battery modules, or individual batteries.

The passive heat transfer elements may be connected to the coolant channel and/or the active cooling system. In some aspects, the passive heat transfer elements may conduct or otherwise transfer heat from the battery modules to the coolant channel. Thus, this may reduce the need for additional active cooling while still providing the requisite cooling for the battery pack. In some aspects, one or more of the passive heat transfer elements may be a heat spreading plate. The heat spreading plates may include a material with high thermal conductivity, such as aluminum or copper. In some aspect, one or more of the passive heat transfer elements may include a heat pipe. In some aspects, the passive heat transfer elements may, for example, reduce the number of fluid connections needed within the battery pack, which may simplify the manufacturing of the battery pack.

Figure 1:
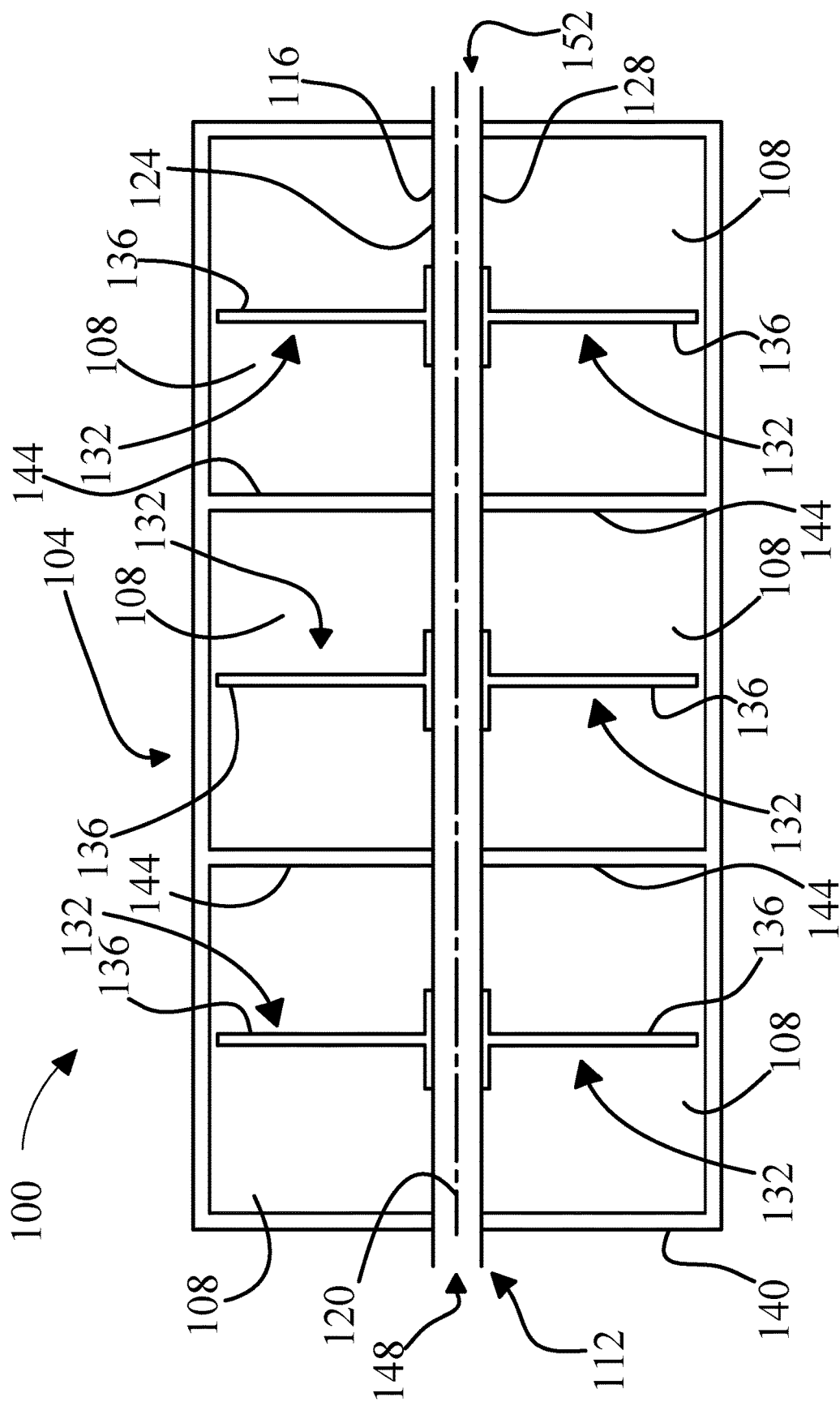
FIG. 1 is an illustration of an exemplary embodiment of an apparatus for active battery pack cooling.

Referring now to FIG. 1, an exemplary embodiment of an apparatus 100 for active battery pack cooling is illustrated. Apparatus 100 includes a battery pack 104. A "battery pack," for the purposes of this disclosure, includes a plurality of battery modules, wherein the plurality of battery modules are fixed together by a structure. A "battery module" contains plurality of battery cells that have been wired together in series, parallel, or a combination of series and parallel, wherein the "battery module" holds the battery cells in a fixed position. Battery module 108 may be consistent with any battery module disclosed in U.S. application Ser. No. 17/404,500, filed on Aug. 17, 2021, and entitled "STACK BATTERY PACK FOR ELECTRIC VERTICAL TAKE-OFF AND LANDING AIRCRAFT," or U.S. application Ser. No. 17/475,743, filed on Sep. 15, 2021, and entitled "BATTERY SYSTEM AND METHOD OF AN ELECTRIC AIRCRAFT WITH SPRING CONDUCTORS," the entirety of both applications is hereby incorporated by reference. Additionally in some embodiments, battery module 108 may be consistent with any battery module disclosed in U.S. application Ser. No. 16/948,140, filed on Sep. 4, 2020, and entitled "SYSTEM AND METHOD FOR HIGH ENERGY DENSITY BATTERY MODULE," the entirety of which is hereby incorporated by reference.

With continued reference to FIG. 1, battery module may include an electrochemical cell. For the purposes of this disclosure, an "electrochemical cell" is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. In some embodiments, battery module 108 may include cylindrical battery cells. For the purposes of this disclosure, cylindrical battery cells are round battery cells that have a larger height than diameter. In some embodiments, battery module 108 may include pouch cell. As used in this disclosure, "pouch cell" is any battery cell or module that includes a pocket. In some cases, a pouch cell may include or be referred to as a prismatic pouch cell, for example when an overall shape of pouch is prismatic. In some cases, a pouch cell may include a pouch which is substantially flexible.

With continued reference to FIG. 1, alternatively or additionally, in some cases, a pouch may be substantially rigid. In some cases, a pouch may include a polymer, such as without limitation polyethylene, acrylic, polyester, and the like. In some embodiments, a pouch may be coated with one or more coatings. For example, in some cases, a pouch may have an outer surface. In some embodiments, an outer surface may be coated with a metalizing coating, such as an aluminum or nickel containing coating. In some embodiments, a pouch coating may be configured to electrically ground and/or isolate pouch, increase pouch impermeability, increase pouches resistance to high temperatures, increases pouches thermal resistance (insulation), and the like. An electrolyte may be located in a pouch. In some embodiments, an electrolyte may include a liquid, a solid, a gel, a paste, and/or a polymer. In some embodiments, an electrolyte may include a lithium salt such as LiPF6. In some embodiments, a lithium salt may include lithium hexafluorophosphate, lithium tetrafluoroborate, lithium perchlorate, or other lithium salts. In some embodiments, a lithium salt may include an organic solvent. In some embodiments, an organic solvent may include ethylene carbonate, dimethyl carbonate, diethyl carbonate or other organic solvents. In some embodiments, an electrolyte may wet or contact one or both of the conductive tabs of a battery cell. A "conductive tab" as used in this disclosure is any protruding component capable of carrying a current.

With continued reference to FIG. 1, battery cells may include without limitation a battery cell using nickel-based chemistries such as nickel cadmium or nickel metal hydride, a battery cell using lithium-ion battery chemistries such as a nickel cobalt aluminum (NCA), nickel manganese cobalt (NMC), lithium iron phosphate (LiFePO4), lithium cobalt oxide (LCO), lithium manganese oxide (LMO), a battery cell using lithium polymer technology, and/or metal-air batteries. Battery cells may include lead-based batteries such as without limitation lead acid batteries and lead carbon batteries. Battery cells may include lithium sulfur batteries, magnesium ion batteries, and/or sodium ion batteries. Battery cells may include solid state batteries or supercapacitors or another suitable energy source. Persons skilled in the art, upon reviewing the entirety of this disclosure, will be aware of various devices of components that may be used as a battery cell.

With continued reference to FIG. 1, apparatus 100 includes an active cooling system 112. For the purposes of this disclosure, an "active cooling system" is a system that is designed to provide cooling using the input of additional energy. The active cooling system 112 includes a coolant channel 116. For the purposes of this disclosure, a "coolant channel" is a passage that is designed to carry a coolant fluid. In some embodiments, coolant channel 116 may be adapted to carry coolant fluid. Coolant channel 116 contains a coolant fluid. In some embodiments, the coolant fluid may be air. In some embodiments, coolant fluid may be water. In some embodiments, the coolant fluid may be a liquid coolant. As a non-limiting example, the liquid coolant may comprise propylene glycol. As another non-limiting embodiment, the liquid coolant may comprise ethylene glycol. In some embodiments, the coolant fluid may be a mixture of one or more of the aforementioned coolant fluids. As a non-limiting example, the coolant fluid may comprise a mixture of water and a liquid coolant. Coolant channel may be consistent with any media channel disclosed in U.S. application Ser. No. 17/665,454, filed on Feb. 4, 2022, and entitled "APPARATUS FOR A GROUND-BASED BATTERY MANAGEMENT FOR AN ELECTRIC AIRCRAFT", the entirety of which is hereby incorporated by reference.

With continued reference to FIG. 1, coolant channel 116 may have a variety of cross-sectional shapes. In some embodiments, coolant channel 116 may be a pipe. For the purposes of this disclosure, a "pipe" is a hollow body for conducting a fluid, gas, liquid, and the like. As a non-limiting example, coolant channel 116 may have a circular cross-section. As another non-limiting example, coolant channel 116 may have a rectangular cross-section. As yet another non-limiting example, coolant channel 116 may have a square cross section. In some embodiments, coolant channel 116 may have an irregular cross-section, wherein the cross-section may change between multiple shapes and/or sizes. In some embodiments, coolant channel may be passage defined by surrounding structures, such that the surrounding structures form a passage through which fluid, liquid, gas, and the like may flow.

With continued reference to FIG. 1, in some embodiments, coolant channel 116 may run down a centerline 120 of the battery pack 104. For the purposes of this disclosure, a "centerline" is a hypothetical line that divides an object into equal parts. For the purposes of this disclosure, in some embodiments, the centerline 120 may be determined using the prospective of FIG. 1. A battery pack 104 may have multiple possible centerlines. As a non-limiting example, centerline 120 may bisect battery pack 104 horizontally (as depicted), vertically, diagonally, and the like. When battery pack 104 is viewed in three dimensions (3D), centerline 120 may form a plane. In this case, coolant channel 116 may be located anywhere along the plane formed by centerline 120. Alternatively or additionally, in some embodiments, a centerline 120 that bisects battery pack 104 horizontally and a centerline 120 that bisects battery pack 104 vertically may form a pair of intersecting planes. In some embodiments, coolant channel 116 may be located along the intersection of the planes.

With continued reference to FIG. 1, coolant channel 116 is in thermal communication with more than one of the plurality of battery modules 108. For the purposes of this disclosure, an object is in "thermal communication" with a second object if a conductive path for heat has been established to permit transfer of heat between the two objects. As a non-limiting example, objects may be in thermal communication if they have a thermal conductivity of 100-450 W/(mK). In some embodiments, thermal communication may mean a direct or indirect connection permitting one object to act as a heat sink for the other object. For the purposes of this disclosure, a "heat sink" is a passive heat exchanger that is configured to transfer heat from a device to a fluid medium. In some embodiments, the active cooling system 112 may include a first side 124 and a second side 128. In some embodiments, first side 124 and second side 128 may be mutually exclusive portions of the active cooling system 112. As a non-limiting example, where coolant channel 116 is a pipe, then first side 124 may be, for example, a top half of the pipe and second side 128 may be a bottom half of the pipe. In some embodiments, a first portion of the plurality of battery modules 108 may be in contact with first side 124 of the active cooling system 112. In some embodiments, a second portion of the plurality of battery module 108 is in contact with second side 128 of the active cooling system 112. For the purposes of this disclosure, an object may be "in contact" or "contacting" another object notwithstanding any thermal pastes, gels, creams, or the like, designed to increase the thermal conduction between the two elements.

With continued reference to FIG. 1, apparatus 100 includes a plurality of passive heat transfer elements 132. A "passive heat transfer element," for the purposes of this disclosure, is an element that transfers heat without the input of additional energy. Each of the plurality of passive heat transfer elements 132 is connected to the active heat transfer system. A variety of fasteners may be used to connect each of the plurality of passive heat transfer elements 132 to the active heat transfer system. As a non-limiting example, the passive heat transfer elements 132 may be welded to the active heat transfer system. As a non-limiting example, the passive heat transfer elements 132 fixed to the active heat transfer system using nails, screws, rivets, bolts, and the like. As another nonlimiting example, passive heat transfer elements 132 may be connected to the active heat transfer system using an adhesive. One of ordinary skill in the art would appreciate, after having reviewed the entirety of this disclosure, that there are a variety of acceptable ways by which passive heat transfer elements 132 may be connected to active heat transfer system. In some embodiments, passive heat transfer elements 132 may be connected to the active heat transfer system such that the heat transfer between the components is maximized, such as, for example, increasing the surface areas of the two elements that are in contact with one another.

With continued reference to FIG. 1, each of the passive heat transfer elements 132 extend to a battery module of the plurality of battery modules 108. For the purposes of this disclosure, "extending to" a battery module 108 includes contacting a battery module 108 or extending into a battery module 108. Each of the plurality of passive heat transfer elements 132 extend away from coolant channel 116. In some embodiments, one or more of passive heat transfer element 132 may extend away from coolant channel 116 at a particular angle. As a non-limiting example, one or more of the passive heat transfer elements 132 may extend away from coolant channel 116 at a 90-degree angle. As a non-limiting example, one or more of the passive heat transfer elements 132 may extend away from coolant channel 116 at a 30-degree angle. As a non-limiting example, one or more of the passive heat transfer elements 132 may extend away from coolant channel 116 at a 45-degree angle. In some embodiments, this angle may be measured where the proximal end of the passive heat transfer element 132 meets the coolant channel 116.

With continued reference to FIG. 1, in some embodiments, the plurality of passive heat transfer elements 132 may comprise heat spreading plates 136. In some cases, the heat spreading plates 136 may be called "heat spreaders."

For the purposes of this disclosure, a "heat spreading plate" is an element designed or configured to conduct heat from a hot area to a colder area. The heat spreading plates 136 may have a variety of shapes. As a non-limiting example, heat spreading plates 136 may have a rectangular cross-section. As a non-limiting example, heat spreading plates 136 may have a square cross-section. As a non-limiting example, heat spreading plates 136 may have a circular cross-section.

With continued reference to FIG. 1, heat spreading plates 136 may comprise a variety of materials. In some embodiments, heat spreading plates 136 may comprise a material with a high thermal conductivity. As a non-limiting example, the heat spreading plates may comprise aluminum. As another non-limiting example, heat spreading plates 136 may comprise copper. In some embodiments, heat spreading plates 136 may comprise primarily or entirely a material with high thermal conductivity. As a non-limiting example, the heat spreading plates may comprise primarily aluminum. As a non-limiting example, the heat spreading plates may comprise entirely aluminum. As another non-limiting example, heat spreading plates 136 may comprise primarily copper. As another non-limiting example, heat spreading plates 136 may comprise entirely copper.

With continued reference to FIG. 1, in some embodiments, battery pack 104 may be contained within a battery case 140. For the purposes of this disclosure, a "battery case" is a component designed to provide structure to battery pack 104 as well as hold at least some of the components of battery case 140 in place relative to one another. In some embodiments, battery case 140 may include a structural arm 144, wherein the structural arm separates components of battery pack 104 and gives structure to battery pack 104. In some embodiments, each of the plurality of battery modules 108 may be separated by a structural arm 144. In some embodiments, the battery modules 108 may be attached to a neighboring structural arm 144. As a non-limiting example, the battery modules 108 may be attached to a neighboring structural arm 144 using an adhesive. As a non-limiting example, the battery modules 108 may be attached to a neighboring structural arm 144 using a fastener such as a screw, nail, adhesive, or the like. As a non-limiting example, the battery modules 108 may be attached to a neighboring structural arm 144 using a weld.

With continued reference to FIG. 1, in some embodiments, battery case 140 may include an active cooling input 148. The "active cooling input," for the purposes of this disclosure, is an opening through which an active cooling system 112 may enter battery case 140. In some embodiments coolant channel 116 may enter battery case 140 through the active cooling input 148. As a non-limiting example, the coolant fluid in coolant channel 116 may enter battery case 140 through active cooling input 148. In some embodiments, battery case 140 may include an active cooling output 152. The "active cooling output," for the purposes of this disclosure, is an opening through which an active cooling system 112 may exit battery case 140. In some embodiments coolant channel 116 may enter battery case 140 through the active cooling output 152. As a non-limiting example, the coolant fluid in coolant channel 116 may exit battery case 140 through active cooling output 152. In some embodiments, coolant channel 116 may fluidly connect the active cooling input 148 and the active cooling output 152. For the purposes of this disclosure, two elements may be considered to be "fluidly connected" if fluid may flow from one element to the other element. Thus, in some embodiments, coolant fluid may flow from active cooling input 148 to active cooling output 152 while moving through battery pack 104.

Figure 2:
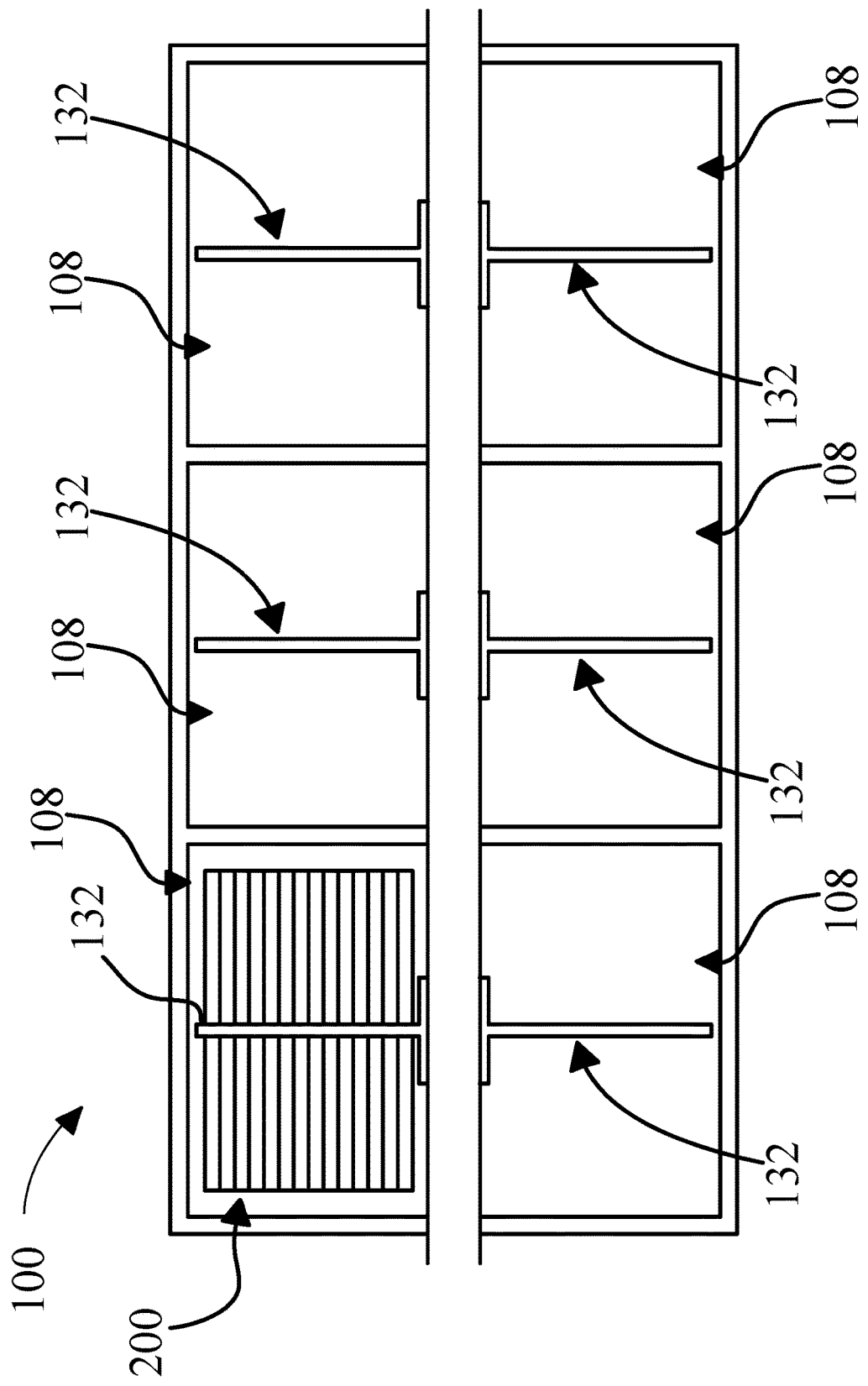
FIG. 2 is an illustration of another exemplary embodiment of an apparatus for active battery pack cooling including a plurality of batteries.

Referring now to FIG. 2, another exemplary embodiment of apparatus 100 is illustrated. In some embodiments, the plurality of battery modules 108, may comprise a plurality of batteries 200. In some embodiments, each of the plurality of battery modules 108, may comprise a plurality of batteries 200. Each of the plurality of batteries 200 may be consistent any batteries and/or electrochemical cells disclosed as part of this disclosure. Regarding FIG. 2, the plurality of batteries 200 is only illustrated with respect to one battery module 108; however, one of ordinary skill in the art, after having reviewed the entirety of this disclosure, would appreciate that the plurality of batteries 200 may be included in any battery module 108 of apparatus 100.

With continued reference to FIG. 2, in some embodiments, some of the plurality of batteries 200 may be cylindrical battery cells. For the purposes of this disclosure, cylindrical battery cells are round battery cells that have a larger height than diameter. In some embodiments, some of the plurality of batteries 200 may be pouch cells. As used in this disclosure, "pouch cell" is any battery cell or module that includes a pocket. In some cases, a pouch cell may include or be referred to as a prismatic pouch cell, for example when an overall shape of pouch is prismatic. In some cases, a pouch cell may include a pouch which is substantially flexible.

With continued reference to FIG. 2, alternatively or additionally, in some cases, a pouch may be substantially rigid. In some cases, a pouch may include a polymer, such as without limitation polyethylene, acrylic, polyester, and the like. In some embodiments, a pouch may be coated with one or more coatings. For example, in some cases, a pouch may have an outer surface. In some embodiments, an outer surface may be coated with a metalizing coating, such as an aluminum or nickel containing coating. In some embodiments, a pouch coating may be configured to electrically ground and/or isolate pouch, increase pouch impermeability, increase pouches resistance to high temperatures, increases pouches thermal resistance (insulation), and the like. An electrolyte may be located in a pouch. In some embodiments, an electrolyte may include a liquid, a solid, a gel, a paste, and/or a polymer. In some embodiments, an electrolyte may include a lithium salt such as LiPF6. In some embodiments, a lithium salt may include lithium hexafluorophosphate, lithium tetrafluoroborate, lithium perchlorate, or other lithium salts. In some embodiments, a lithium salt may include an organic solvent. In some embodiments, an organic solvent may include ethylene carbonate, dimethyl carbonate, diethyl carbonate or other organic solvents. In some embodiments, an electrolyte may wet or contact one or both of a pair of conductive tabs of a battery cell. A "conductive tab" as used in this disclosure is any protruding component capable of carrying a current.

With continued reference to FIG. 2, plurality of batteries 200 may include without limitation a battery cell using nickel-based chemistries such as nickel cadmium or nickel metal hydride, a battery cell using lithium-ion battery chemistries such as a nickel cobalt aluminum (NCA), nickel manganese cobalt (NMC), lithium iron phosphate (LiFePO4), lithium cobalt oxide (LCO), lithium manganese oxide (LMO), a battery cell using lithium polymer technology, and/or metal-air batteries. Battery cells may include lead-based batteries such as without limitation lead acid batteries and lead carbon batteries. Battery cells may include lithium sulfur batteries, magnesium ion batteries, and/or sodium ion batteries. Battery cells may include solid state batteries or supercapacitors or another suitable energy source. Persons skilled in the art, upon reviewing the entirety of this disclosure, will be aware of various devices of components that may be used as a battery cell.

With continued reference to FIG. 2, the plurality of batteries 200 may be arranged in pairs. For example, in some embodiments, each pair of the plurality of batteries 200 may be located on either side of passive heat transfer element 132. Thus, in some embodiments, both sides of passive heat transfer element 132 may be in contact with batteries of the plurality of batteries 200. As a nonlimiting example, a first battery from the plurality of batteries 200 may contact passive heat transfer element 132 on one side, while a second battery of the plurality of batteries 200 may contact passive heat transfer element 132 on the other side. In some embodiments, this battery of the plurality of batteries 200 may be directly opposite the second battery of the plurality of batteries 200. In some embodiments, passive heat transfer element 132 may be in contact with each battery of the plurality of batteries 200.

Figure 3:
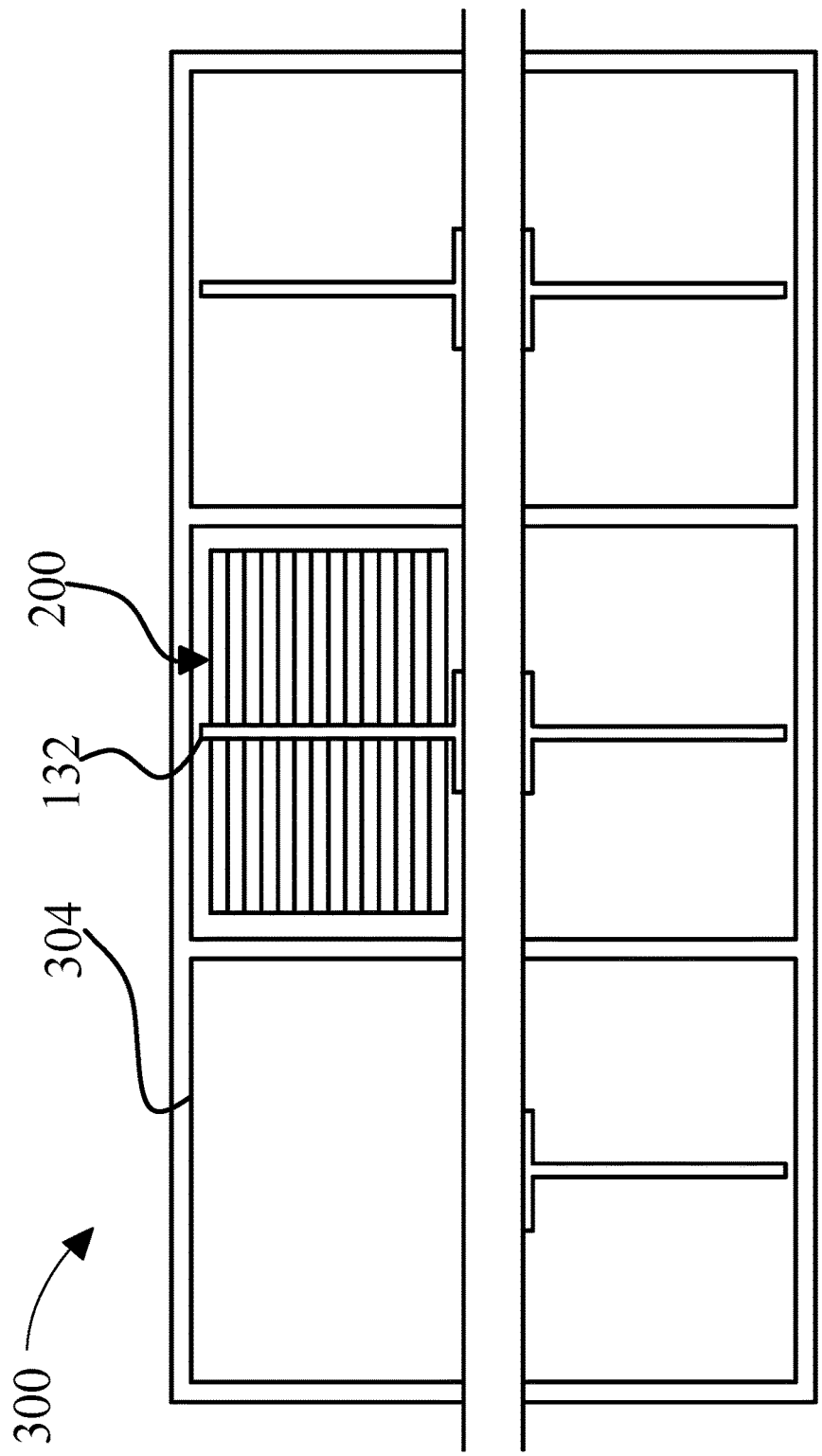
FIG. 3 is an illustration of an exemplary embodiment of an apparatus for active battery pack cooling including a pack interface assembly.

Referring now to FIG. 3, an exemplary embodiment of an apparatus for active battery pack cooling with a pack interface assembly 300 is depicted. In some embodiments, apparatus 300 may include a pack interface assembly 304. In some embodiments, pack interface assembly 304 may be contained within battery case 140. In some embodiments, pack interface assembly 304 may be communicatively connected to a battery management system. The battery management system may be consistent with any battery management system disclosed in U.S. application Ser. No. 17/108,798, filed on Dec. 1, 2020, and titled "SYSTEMS AND METHODS FOR A BATTERY MANAGEMENT SYSTEM INTEGRATED IN A BATTERY PACK CONFIGURED FOR USE IN ELECTRIC AIRCRAFT," the entirety of which is hereby incorporated by reference. The pack interface assembly 304 may serve as an interface between battery pack 104 and the components therein.

With continued reference to FIG. 3, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Figure 4:
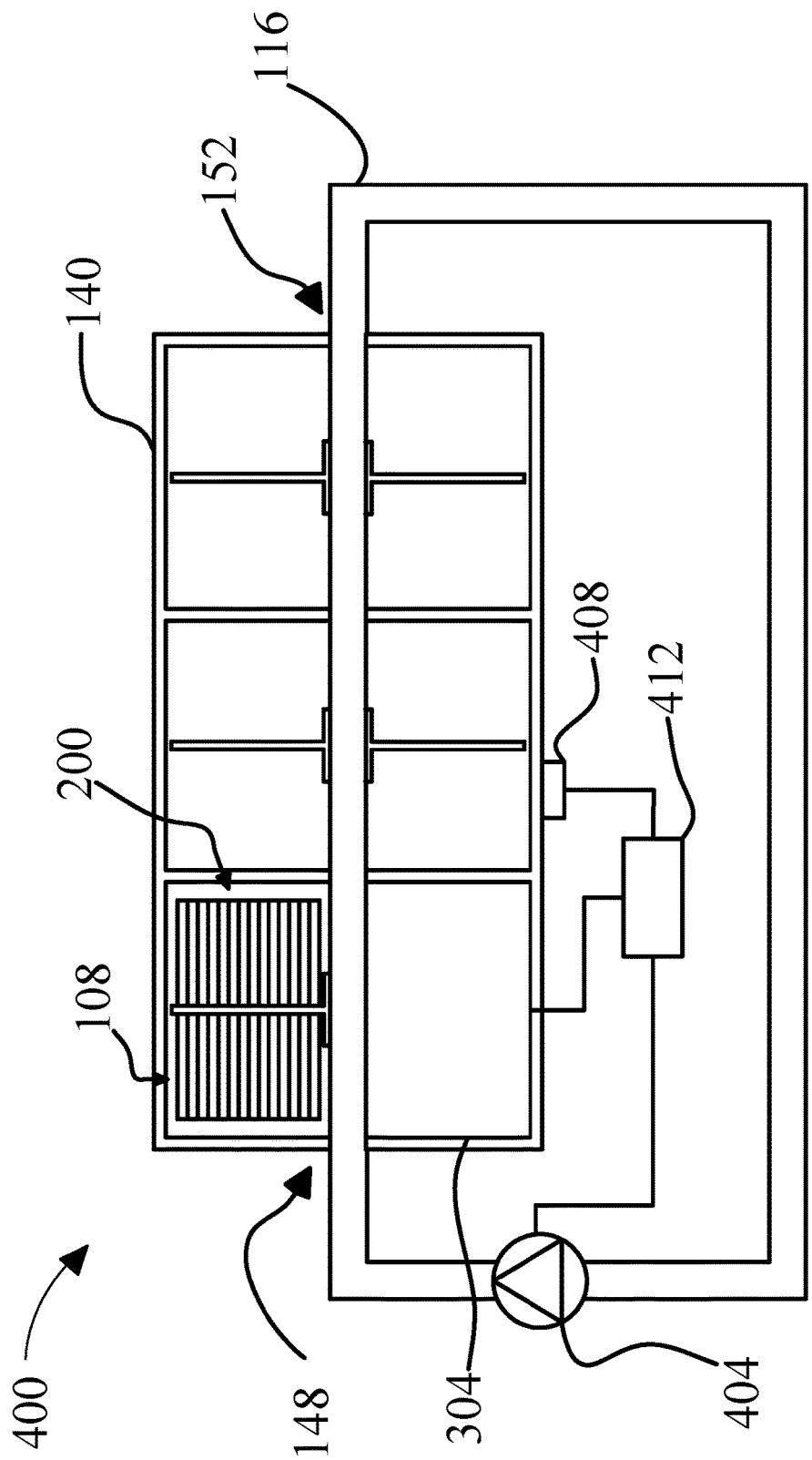
FIG. 4 is an illustration of an exemplary embodiment of an apparatus for active battery pack cooling including a pump.

With continued reference to FIG. 3, With continued reference to FIG. 4, in some embodiments, pack interface assembly 304 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. pack interface assembly 304 may include a single computing device operating independently, or may include two or more computing device operating in concert, in parallel, sequentially or the like; two or more computing devices may be included together in a single computing device or in two or more computing devices. pack interface assembly 304 may interface or communicate with one or more additional devices as described below in further detail via a network interface device. Network interface device may be utilized for connecting pack interface assembly 304 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. pack interface assembly 304 may include but is not limited to, for example, a computing device or cluster of computing devices in a first location and a second computing device or cluster of computing devices in a second location. pack interface assembly 304 may include one or more computing devices dedicated to data storage, security, distribution of traffic for load balancing, and the like. pack interface assembly 304 may distribute one or more computing tasks as described below across a plurality of computing devices of computing device, which may operate in parallel, in series, redundantly, or in any other manner used for distribution of tasks or memory between computing devices. pack interface assembly 304 may be implemented using a "shared nothing" architecture in which data is cached at the worker, in an embodiment, this may enable scalability of system 100 and/or computing device.

With continued reference to FIG. 3, pack interface assembly 304 may be designed and/or configured to perform any method, method step, or sequence of method steps in any embodiment described in this disclosure, in any order and with any degree of repetition. For instance, pack interface assembly 304 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. pack interface assembly 304 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Referring now to FIG. 4, another exemplary embodiment of an apparatus for active battery pack cooling 400 is illustrated. Elements of apparatus 400 may be consistent with apparatus 300, apparatus 100, or any apparatus for active battery pack cooling described as part of this disclosure.

With continued reference to FIG. 4, apparatus 400 may include a pump 404. Pump 404 may include a substantially constant pressure pump (e.g., centrifugal pump) or a substantially constant flow pump (e.g., positive displacement pump, gear pump, and the like). Pump 404 can be hydrostatic or hydrodynamic. As used in this disclosure, a "pump" is a mechanical source of power that converts mechanical power into fluidic energy. A pump may generate flow with enough power to overcome pressure induced by a load at a pump outlet. A pump may generate a vacuum at a pump inlet, thereby forcing fluid from a reservoir into the pump inlet to the pump and by mechanical action delivering this fluid to a pump outlet. Hydrostatic pumps are positive displacement pumps. Hydrodynamic pumps can be fixed displacement pumps, in which displacement may not be adjusted, or variable displacement pumps, in which the displacement may be adjusted. Exemplary non-limiting pumps include gear pumps, rotary vane pumps, screw pumps, bent axis pumps, inline axial piston pumps, radial piston pumps, and the like. Pump may be powered by any rotational mechanical work source, for example without limitation and electric motor or a power take off from an engine. Pump 404 may be in fluidic communication with at least a reservoir. In some cases, reservoir may be unpressurized and/or vented. Alternatively, reservoir may be pressurized and/or sealed. Pump 404 may be in fluid communication with coolant channel 116. In some embodiments, pump 404 may be configured to move the coolant fluid through coolant channel 116. In some embodiments, pump 404 may be configured to move the coolant fluid through coolant channel 116. This means that, as a non-limiting example, pump 404 may move the coolant fluid from an active cooling input 148 to an active cooling output 152.

With continued reference to FIG. 4, in some embodiments, apparatus 400 may include a temperature sensor. As used in this disclosure, a "sensor" is a device that is configured to detect a phenomenon and transmit information and/or a datum related to the detection of the phenomenon. For instance, and without limitation, a sensor may transform an electrical and/or nonelectrical stimulation into an electrical signal that is suitable to be processed by an electrical circuit, such as a controller. A sensor may generate a sensor output signal, which transmits information and/or datum related to a detection by the sensor. A sensor output signal may include any signal form described in this disclosure, such as for example, digital, analog, optical, electrical, fluidic, and the like. In some cases, a sensor, a circuit, and/or a controller may perform one or more signal processing steps on a signal. For instance, a sensor, circuit, and/or controller may analyze, modify, and/or synthesize a signal in order to improve the signal, for instance by improving transmission, storage efficiency, or signal to noise ratio.

With continued reference to FIG. 4, a "temperature sensor" is a sensor configured to detect temperature and transmit information and/or a datum related to the detection of the temperature. In one or more embodiments, temperature sensor 408 may include one or more thermocouples, thermistors, thermometers, passive infrared sensors, resistance temperature sensors (RTDs), semiconductor based integrated circuits (IC), and the like. "Temperature", for the purposes of this disclosure, and as would be appreciated by someone of ordinary skill in the art, is a measure of the heat energy of a system. Temperature may be measured in Fahrenheit (° F.), Celsius (° C.), Kelvin (° K), or another scale alone, or in combination.

With continued reference to FIG. 4, in some embodiments, temperature sensor 408 may be configured to output a temperature datum. For the purposes of this disclosure, "temperature datum" is an electronic signal representing information and/or datum of a detected temperature. Temperature sensor 408 may be in a variety of locations. In some embodiments, temperature sensor 408 may be attached to battery case 140. In some embodiments, temperature sensor 408 may be attached to a battery module of plurality of battery modules 108. In some embodiments, temperature sensor 408 may be attached to a battery of plurality of batteries 200. In some embodiments, temperature sensor 408 may be communicatively connected to pack interface assembly 304.

With continued reference to FIG. 4, in some embodiments, temperature sensor 408 may be configured to measure a temperature of the plurality of battery modules 108. In some embodiments, temperature sensor 408 may be configured to measure a temperature of the plurality of batteries 200. In some embodiments, temperature sensor 408 may be configured to measure a temperature of battery case 140.

With continued reference to FIG. 4, in some embodiments, temperature sensor 408 may be part of a sensor array. A "sensor array," for the purposes of this disclosure, is a group of a plurality of sensors. In some embodiments, each sensor in the sensor array may detect the same physical phenomenon (e.g. temperature). In other embodiments, different sensors in the sensor array may detect different physical phenomena. Non-limiting examples of physical phenomena include temperature, current, voltage, humidity, pressure, vibration, and the like. In some embodiments, temperature sensor 408 may include a plurality of temperature sensors consistent with this disclosure. As a non-limiting example, temperature sensor 408 may include a plurality of temperature sensors, wherein each of the temperature sensors measures a temperature of a different battery module of the plurality of battery modules 108. As a non-limiting example, temperature sensor 408 may include a plurality of temperature sensors measuring the temperature of a plurality of batteries 200. In some embodiments, wherein temperature sensor 408 measures multiple different temperatures, temperature sensor 408 may average together the multiple different temperatures.

With continued reference to FIG. 4, in some embodiments, apparatus 400 may include a controller 412. Controller 412 may be communicatively connected to temperature sensor 408. Controller 412 may be communicatively connected to pump 404. In some embodiments, controller 412 may be communicatively connected to pack interface assembly 304.

With continued reference to FIG. 4, in some embodiments, apparatus 400 may include a controller 412. Controller 412 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. controller 412 may include a single computing device operating independently, or may include two or more computing device operating in concert, in parallel, sequentially or the like; two or more computing devices may be included together in a single computing device or in two or more computing devices. controller 412 may interface or communicate with one or more additional devices as described below in further detail via a network interface device. Network interface device may be utilized for connecting controller 412 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. controller 412 may include but is not limited to, for example, a computing device or cluster of computing devices in a first location and a second computing device or cluster of computing devices in a second location. controller 412 may include one or more computing devices dedicated to data storage, security, distribution of traffic for load balancing, and the like. controller 412 may distribute one or more computing tasks as described below across a plurality of computing devices of computing device, which may operate in parallel, in series, redundantly, or in any other manner used for distribution of tasks or memory between computing devices. controller 412 may be implemented using a "shared nothing" architecture in which data is cached at the worker, in an embodiment, this may enable scalability of system 100 and/or computing device.

With continued reference to FIG. 4, controller 412 may be designed and/or configured to perform any method, method step, or sequence of method steps in any embodiment described in this disclosure, in any order and with any degree of repetition. For instance, controller 412 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. controller 412 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 4, in some embodiments, controller 412 may be a flight controller, consistent with any flight controller disclosed as part of this disclosure. In some embodiments, controller 412 may be a battery management system. The battery management system may be consistent with any battery management system disclosed in U.S. application Ser. No. 17/108,798, filed on Dec. 1, 2020, and titled "SYSTEMS AND METHODS FOR A BATTERY MANAGEMENT SYSTEM INTEGRATED IN A BATTERY PACK CONFIGURED FOR USE IN ELECTRIC AIRCRAFT," the entirety of which is hereby incorporated by reference.

With continued reference to FIG. 4, in some embodiments, controller 412 may be configured to control pump 404 as a function of the temperature datum measured by temperature sensor 408 attached to battery pack 104. In some embodiments, controller 412 may switch on or off pump 404 as a function of the temperature datum. As a non-limiting example, controller 412 may switch on pump 404 if temperature datum indicates that battery pack 104 requires cooling. As a non-limiting example, temperature datum may indicate that battery pack 104 requires cooling if the temperature datum exceeds a threshold value. As a non-limiting example, controller 412 may switch off pump 404 if temperature datum indicates that battery pack 104 does not need cooling. As a non-limiting example, temperature datum may indicate that battery pack 104 does not need cooling if the temperature datum falls below a threshold value. In some embodiments, switching on and off pump 404 may be accomplished by actuating a switch, relay, or the like.

With continued reference to FIG. 4, in some embodiments, controller 412 may control pump 404 by changing the pump rate of pump 404. "Pump rate," for the purposes of this disclosure, is the volume of liquid that travels through a pump over a given period of time. In some embodiments, controller 412 may be configured to increase the pump rate of pump 404. In some embodiments, controller 412 may be configured to decrease the pump rate of pump 404. As a non-limiting example, controller 412 increase the pump rate of pump 404 if temperature datum indicates that battery pack 104 requires cooling. As a non-limiting example, controller 412 may decrease the pump rate of pump 404 if temperature datum indicates that battery pack 104 does not need cooling. In some embodiments, controller 412 may control pump 404 by sending a control signal to pump 404.

Figure 5:
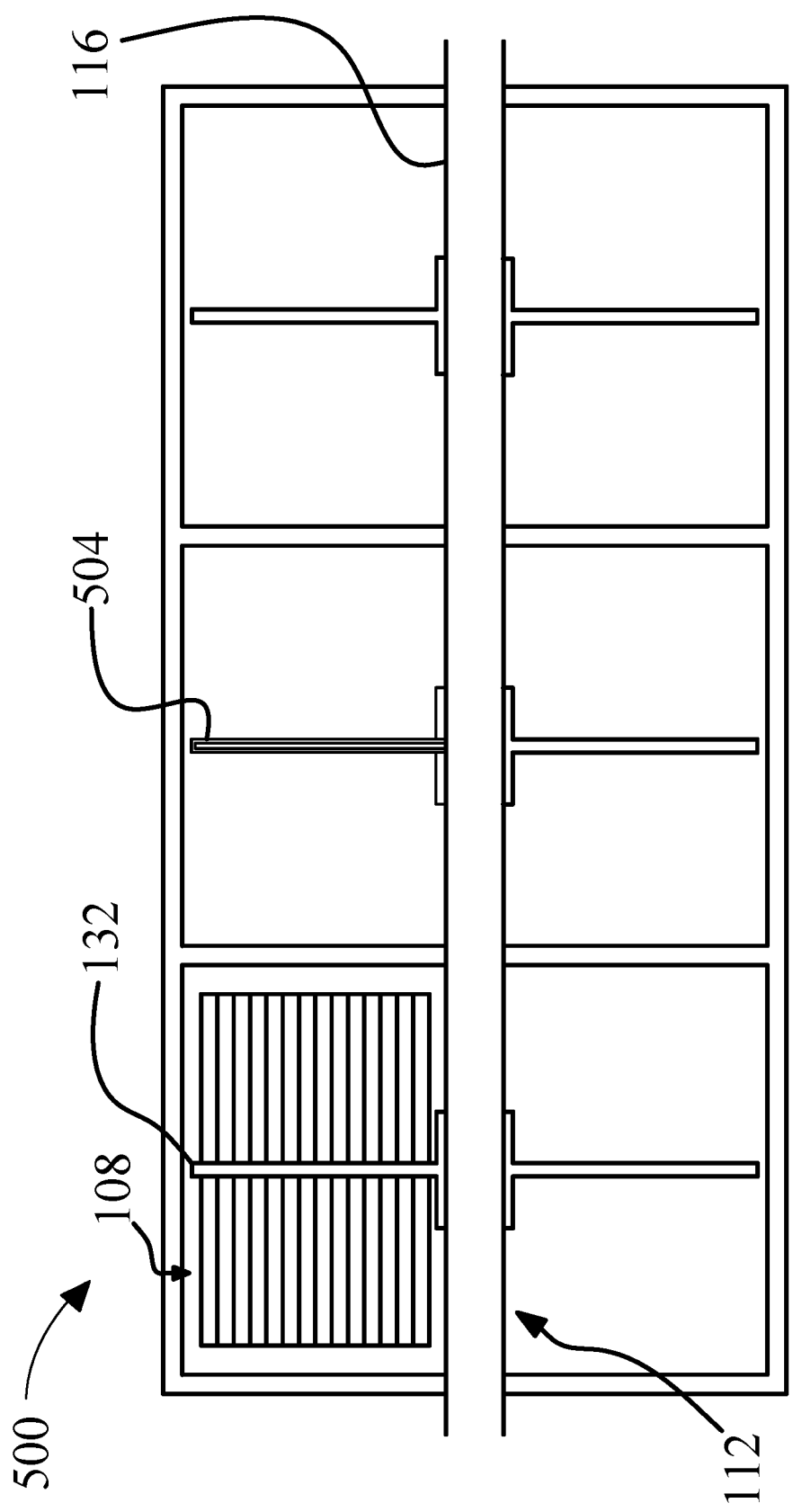
FIG. 5 is an illustration of an exemplary embodiment of an apparatus for active battery pack cooling including a heat pipe.

Referring now to FIG. 5, another exemplary embodiment of an apparatus for active battery pack cooling 500 with a heat pipe is illustrated. Apparatus 500 may be consistent with any apparatus for active battery pack cooling disclosed as part of this disclosure. In some embodiments, the plurality of passive heat transfer elements 132 may include a heat pipe 504. For the purposes of this disclosure, a "heat pipe" is a sealed enclosure containing a phase change material. In some embodiments, heat pipe 504 includes a phase change material hermetically sealed within a material with high thermal conductivity. Heat pipe 504 may be used to from one or more battery pack modules of the plurality of battery modules 108. In some embodiments, heat pipe 504 may be thermally connected to one or more battery pack modules of the plurality of battery modules 108. In some embodiments, heat pipe 504 may be thermally connected to coolant channel 116 and/or the active cooling system 112. In some embodiments, each passive heat transfer element of the plurality of passive heat transfer elements 132 may include heat pipe 504.

Figure 6:
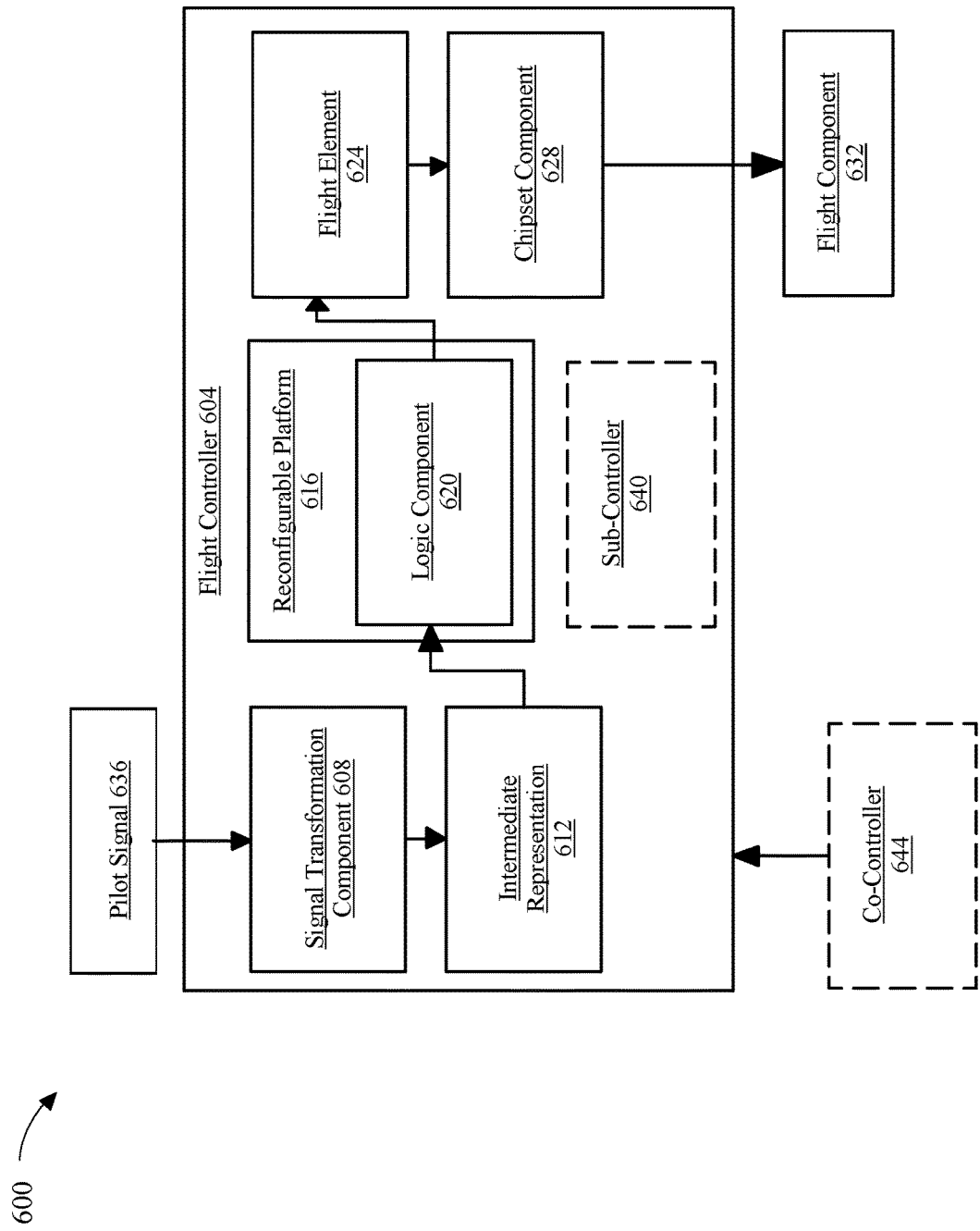
FIG. 6 is a block diagram of an exemplary embodiment of a flight controller.

Now referring to FIG. 6, an exemplary embodiment 600 of a flight controller 604 is illustrated. As used in this disclosure a "flight controller" is a computing device of a plurality of computing devices dedicated to data storage, security, distribution of traffic for load balancing, and flight instruction. Flight controller 604 may include and/or communicate with any computing device as described in this disclosure, including without limitation a microcontroller, microprocessor, digital signal processor (DSP) and/or system on a chip (SoC) as described in this disclosure. Further, flight controller 604 may include a single computing device operating independently, or may include two or more computing device operating in concert, in parallel, sequentially or the like; two or more computing devices may be included together in a single computing device or in two or more computing devices. In embodiments, flight controller 604 may be installed in an aircraft, may control the aircraft remotely, and/or may include an element installed in the aircraft and a remote element in communication therewith.

In an embodiment, and still referring to FIG. 6, flight controller 604 may include a signal transformation component 608. As used in this disclosure a "signal transformation component" is a component that transforms and/or converts a first signal to a second signal, wherein a signal may include one or more digital and/or analog signals. For example, and without limitation, signal transformation component 608 may be configured to perform one or more operations such as preprocessing, lexical analysis, parsing, semantic analysis, and the like thereof. In an embodiment, and without limitation, signal transformation component 608 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 608 may include transforming one or more low-level languages such as, but not limited to, machine languages and/or assembly languages. For example, and without limitation, signal transformation component 608 may include transforming a binary language signal to an assembly language signal. In an embodiment, and without limitation, signal transformation component 608 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 6, signal transformation component 608 may be configured to optimize an intermediate representation 612. As used in this disclosure an "intermediate representation" is a data structure and/or code that represents the input signal. Signal transformation component 608 may optimize intermediate representation as a function of a data-flow analysis, dependence analysis, alias analysis, pointer analysis, escape analysis, and the like thereof. In an embodiment, and without limitation, signal transformation component 608 may optimize intermediate representation 612 as a function of one or more inline expansions, dead code eliminations, constant propagation, loop transformations, and/or automatic parallelization functions. In another embodiment, signal transformation component 608 may optimize intermediate representation as a function of a machine dependent optimization such as a peephole optimization, wherein a peephole optimization may rewrite short sequences of code into more efficient sequences of code. Signal transformation component 608 may optimize intermediate representation to generate an output language, wherein an "output language," as used herein, is the native machine language of flight controller 604. For example, and without limitation, native machine language may include one or more binary and/or numerical languages.

In an embodiment, and without limitation, signal transformation component 608 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 6, flight controller 604 may include a reconfigurable hardware platform 616. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 616 may be reconfigured to enact any algorithm and/or algorithm selection process received from another computing device and/or created using machine-learning processes.

Still referring to FIG. 6, reconfigurable hardware platform 616 may include a logic component 620. As used in this disclosure a "logic component" is a component that executes instructions on output language. For example, and without limitation, logic component may perform basic arithmetic, logic, controlling, input/output operations, and the like thereof. Logic component 620 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 620 may be organized according to Von Neumann and/or Harvard architecture as a non-limiting example. Logic component 620 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 620 may include one or more integrated circuit microprocessors, which may contain one or more central processing units, central processors, and/or main processors, on a single metal-oxide-semiconductor chip. Logic component 620 may be configured to execute a sequence of stored instructions to be performed on the output language and/or intermediate representation 612. Logic component 620 may be configured to fetch and/or retrieve the instruction from a memory cache, wherein a "memory cache," as used in this disclosure, is a stored instruction set on flight controller 604. Logic component 620 may be configured to decode the instruction retrieved from the memory cache to opcodes and/or operands. Logic component 620 may be configured to execute the instruction on intermediate representation 612 and/or output language. For example, and without limitation, logic component 620 may be configured to execute an addition operation on intermediate representation 612 and/or output language.

In an embodiment, and without limitation, logic component 620 may be configured to calculate a flight element 624. As used in this disclosure a "flight element" is an element of datum denoting a relative status of aircraft. For example, and without limitation, flight element 624 may denote one or more torques, thrusts, airspeed velocities, forces, altitudes, groundspeed velocities, directions during flight, directions facing, forces, orientations, and the like thereof. For example, and without limitation, flight element 624 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 624 may denote that aircraft is following a flight path accurately and/or sufficiently.

Still referring to FIG. 6, flight controller 604 may include a chipset component 628. As used in this disclosure a "chipset component" is a component that manages data flow. In an embodiment, and without limitation, chipset component 628 may include a northbridge data flow path, wherein the northbridge dataflow path may manage data flow from logic component 620 to a high-speed device and/or component, such as a RAM, graphics controller, and the like thereof. In another embodiment, and without limitation, chipset component 628 may include a southbridge data flow path, wherein the southbridge dataflow path may manage data flow from logic component 620 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 628 may manage data flow between logic component 620, memory cache, and a flight component 632. As used in this disclosure a "flight component" is a portion of an aircraft that can be moved or adjusted to affect one or more flight elements. For example, flight component 632 may include a component used to affect the aircrafts' roll and pitch which may comprise one or more ailerons. As a further example, flight component 632 may include a rudder to control yaw of an aircraft. In an embodiment, chipset component 628 may be configured to communicate with a plurality of flight components as a function of flight element 624. For example, and without limitation, chipset component 628 may transmit to an aircraft rotor to reduce torque of a first lift propulsor and increase the forward thrust produced by a pusher component to perform a flight maneuver.

In an embodiment, and still referring to FIG. 6, flight controller 604 may be configured generate an autonomous function. As used in this disclosure an "autonomous function" is a mode and/or function of flight controller 604 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 624. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 604 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 604 will control the ailerons and/or rudders. As used in this disclosure "non-autonomous mode" is a mode that denotes a pilot will control aircraft and/or maneuvers of aircraft in its entirety.

In an embodiment, and still referring to FIG. 6, flight controller 604 may generate autonomous function as a function of an autonomous machine-learning model. As used in this disclosure an "autonomous machine-learning model" is a machine-learning model to produce an autonomous function output given flight element 624 and a pilot signal 636 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 636 may denote that a pilot is controlling and/or maneuvering ailerons, wherein the pilot is not in control of the rudders and/or propulsors. In an embodiment, pilot signal 636 may include an implicit signal and/or an explicit signal. For example, and without limitation, pilot signal 636 may include an explicit signal, wherein the pilot explicitly states there is a lack of control and/or desire for autonomous function. As a further non-limiting example, pilot signal 636 may include an explicit signal directing flight controller 604 to control and/or maintain a portion of aircraft, a portion of the flight plan, the entire aircraft, and/or the entire flight plan. As a further non-limiting example, pilot signal 636 may include an implicit signal, wherein flight controller 604 detects a lack of control such as by a malfunction, torque alteration, flight path deviation, and the like thereof. In an embodiment, and without limitation, pilot signal 636 may include one or more explicit signals to reduce torque, and/or one or more implicit signals that torque may be reduced due to reduction of airspeed velocity. In an embodiment, and without limitation, pilot signal 636 may include one or more local and/or global signals. For example, and without limitation, pilot signal 636 may include a local signal that is transmitted by a pilot and/or crew member. As a further non-limiting example, pilot signal 636 may include a global signal that is transmitted by air traffic control and/or one or more remote users that are in communication with the pilot of aircraft. In an embodiment, pilot signal 636 may be received as a function of a tri-state bus and/or multiplexor that denotes an explicit pilot signal should be transmitted prior to any implicit or global pilot signal.

Still referring to FIG. 6, autonomous machine-learning model may include one or more autonomous machine-learning processes such as supervised, unsupervised, or reinforcement machine-learning processes that flight controller 604 and/or a remote device may or may not use in the generation of autonomous function. As used in this disclosure "remote device" is an external device to flight controller 604. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 6, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 604 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 6, flight controller 604 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 604. Remote device and/or FPGA may transmit a signal, bit, datum, or parameter to flight controller 604 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 604 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 6, flight controller 604 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 6, flight controller 604 may include, but is not limited to, for example, a cluster of flight controllers in a first location and a second flight controller or cluster of flight controllers in a second location. Flight controller 604 may include one or more flight controllers dedicated to data storage, security, distribution of traffic for load balancing, and the like. Flight controller 604 may be configured to distribute one or more computing tasks as described below across a plurality of flight controllers, which may operate in parallel, in series, redundantly, or in any other manner used for distribution of tasks or memory between computing devices. For example, and without limitation, flight controller 604 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 6, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 632. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 6, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 604. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 612 and/or output language from logic component 620, wherein output language may include one or more analog-to-digital conversions, low bit rate transmissions, message encryptions, digital signals, binary signals, logic signals, analog signals, and the like thereof described above in detail.

Still referring to FIG. 6, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 6, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 6, flight controller 604 may also be implemented using a "shared nothing" architecture in which data is cached at the worker, in an embodiment, this may enable scalability of aircraft and/or computing device. Flight controller 604 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 6, flight controller may include a sub-controller 640. As used in this disclosure a "sub-controller" is a controller and/or component that is part of a distributed controller as described above; for instance, flight controller 604 may be and/or include a distributed flight controller made up of one or more sub-controllers. For example, and without limitation, sub-controller 640 may include any controllers and/or components thereof that are similar to distributed flight controller and/or flight controller as described above. Sub-controller 640 may include any component of any flight controller as described above. Sub-controller 640 may be implemented in any manner suitable for implementation of a flight controller as described above. As a further non-limiting example, sub-controller 640 may include one or more processors, logic components and/or computing devices capable of receiving, processing, and/or transmitting data across the distributed flight controller as described above. As a further non-limiting example, sub-controller 640 may include a controller that receives a signal from a first flight controller and/or first distributed flight controller component and transmits the signal to a plurality of additional sub-controllers and/or flight components.

Still referring to FIG. 6, flight controller may include a co-controller 644. As used in this disclosure a "co-controller" is a controller and/or component that joins flight controller 604 as components and/or nodes of a distributer flight controller as described above. For example, and without limitation, co-controller 644 may include one or more controllers and/or components that are similar to flight controller 604. As a further non-limiting example, co-controller 644 may include any controller and/or component that joins flight controller 604 to distributer flight controller. As a further non-limiting example, co-controller 644 may include one or more processors, logic components and/or computing devices capable of receiving, processing, and/or transmitting data to and/or from flight controller 604 to distributed flight control system. Co-controller 644 may include any component of any flight controller as described above. Co-controller 644 may be implemented in any manner suitable for implementation of a flight controller as described above.

In an embodiment, and with continued reference to FIG. 6, flight controller 604 may be designed and/or configured to perform any method, method step, or sequence of method steps in any embodiment described in this disclosure, in any order and with any degree of repetition. For instance, flight controller 604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 7:
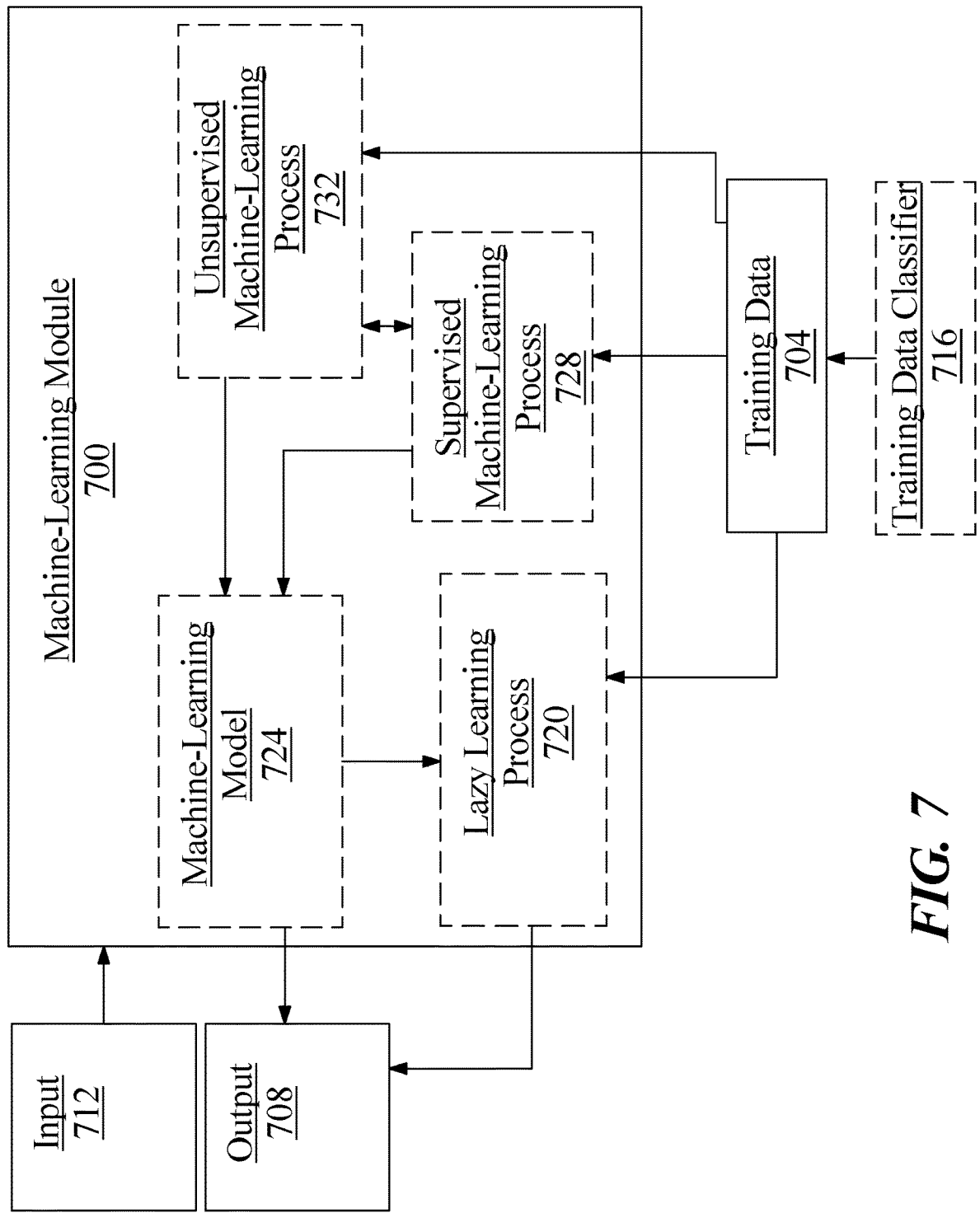
FIG. 7 is a block diagram of an exemplary embodiment of a machine learning module.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example flight elements and/or pilot signals may be inputs, wherein an output may be an autonomous function.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
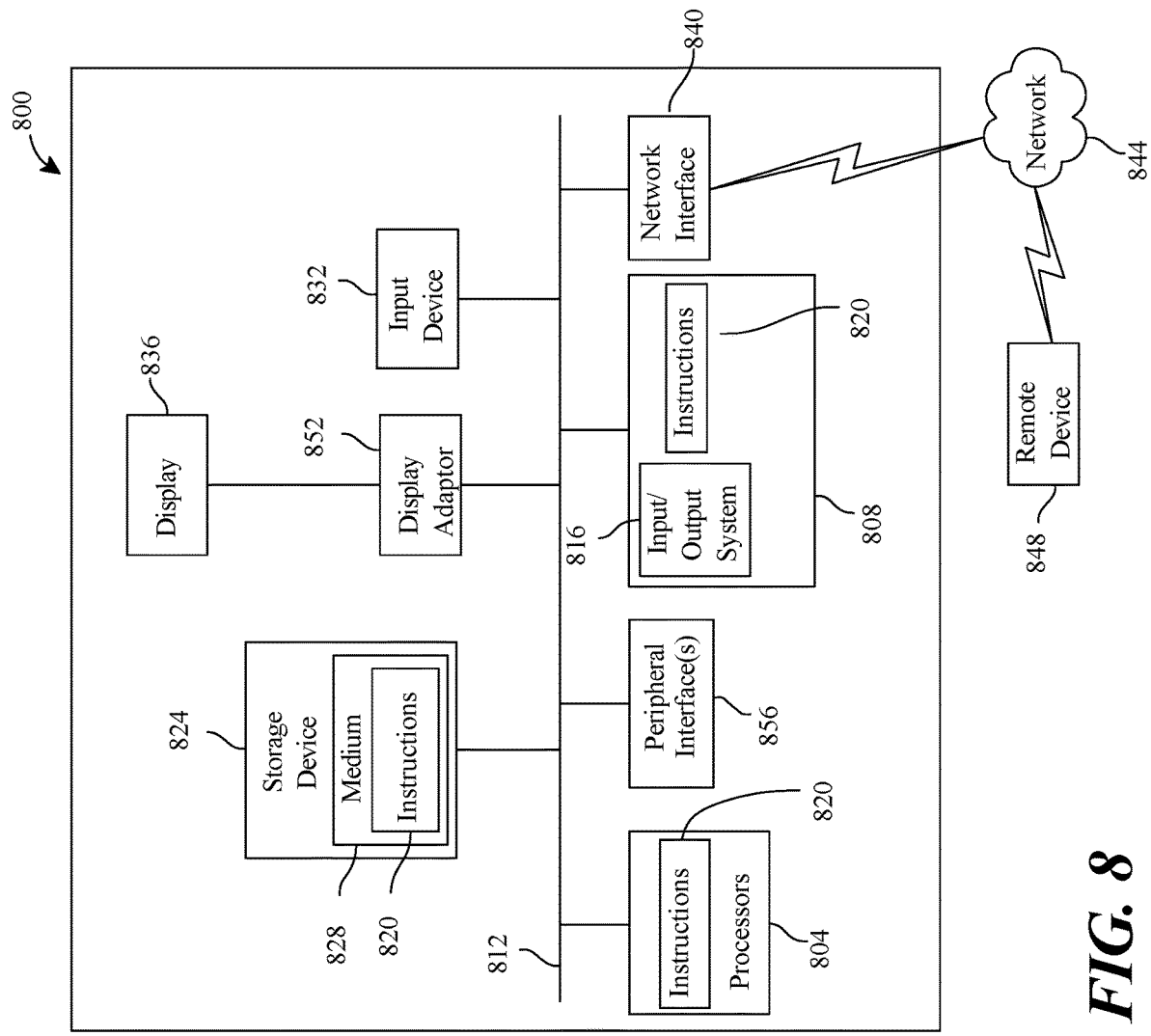
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for active battery pack cooling, the apparatus comprising:
    a battery pack comprising a plurality of battery modules, wherein a battery module of the plurality of battery modules comprises a pouch cell, wherein the pouch cell comprises:
        a battery cell comprising a pocket; and
        a pouch coating along the outer surface of the battery cell configured to increase thermal resistance of the battery cell;
    an active cooling system, the active cooling system comprising a coolant channel wherein the coolant channel contains a coolant fluid, wherein the active cooling system is in thermal communication with more than one of the plurality of battery modules;
    a plurality of passive heat transfer elements, wherein each of the plurality of passive heat transfer elements:
        is connected to the active cooling system;
        comprises a heat pipe, wherein the heat pipe comprises a phase change material hermetically sealed within a high thermal conductivity material;
        extends to a battery module of the plurality of battery modules; and
        extends away from the coolant channel;
    a battery case containing the battery pack; and
    a pack interface assembly contained within the battery case, wherein the pack interface assembly comprises a computing device.

2. The apparatus of claim 1, wherein the battery case comprises:
    an active cooling input; and
    an active cooling output, wherein the coolant channel fluidly connects the active cooling input and the active cooling output.

3. The apparatus of claim 2, wherein the coolant channel runs down a centerline of the battery pack.

4. The apparatus of claim 2, wherein:
    the coolant fluid enters the battery case at the active cooling input; and
    the coolant fluid exits the battery case at the active cooling output.

5. The apparatus of claim 1, wherein the coolant fluid comprises water.

6. The apparatus of claim 1, wherein the coolant fluid comprises propylene glycol.

7. The apparatus of claim 1, wherein each of the plurality of battery modules comprise a plurality of batteries.

8. The apparatus of claim 7, wherein a passive heat transfer element of the plurality of passive heat transfer elements is in contact with each battery of the plurality of batteries in a battery module.

9. The apparatus of claim 8, wherein the plurality of batteries are arranged in pairs such that a battery from each pair is located on either side of the passive heat transfer element.

10. The apparatus of claim 2, wherein:
    a first portion of the plurality of battery modules is in contact with a first side of the active cooling system; and
    a second portion of the plurality of battery modules is in contact with a second side of the active cooling system.

11. The apparatus of claim 1, wherein the active cooling system further comprises a pump, the pump configured to move the coolant fluid through the coolant channel.

12. The apparatus of claim 11, further comprising a controller communicatively connected to the pump.

13. The apparatus of claim 12, further comprising a temperature sensor communicatively connected to the controller, wherein:
    the temperature sensor is configured to measure a temperature of the plurality of battery modules, the temperature sensor communicatively connected to the controller; and
    the controller is configured to control the pump as a function of the temperature of the plurality of battery modules.

14. The apparatus of claim 1, wherein the plurality of passive heat transfer elements comprises heat spreading plates.

15. The apparatus of claim 14, wherein the heat spreading plates comprise aluminum.

16. The apparatus of claim 14, wherein the heat spreading plates comprise copper.

17. The apparatus of claim 1, wherein the heat pipe is thermally connected to the coolant channel.

18. The apparatus of claim 1, wherein the pack interface assembly is communicatively connected to a battery management system.

* * * * *